US009746575B2

(12) United States Patent
Lee et al.

(10) Patent No.: US 9,746,575 B2
(45) Date of Patent: Aug. 29, 2017

(54) INDUCTION TYPE BROADBAND 3-COMPONENT BOREHOLE MAGNETIC MEASURING SENSOR AND BOREHOLE ELECTROMAGNETIC TOMOGRAPHY METHOD USING THE SAME

(71) Applicant: Korea Institute of Geoscience and Mineral Resources, Daejeon (KR)

(72) Inventors: Tae Jong Lee, DaeJeon (KR); Yoonho Song, DaeJeon (KR); Myeong Jong Yi, YuSeong-Gu (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 103 days.

(21) Appl. No.: 14/530,302

(22) Filed: Oct. 31, 2014

(65) Prior Publication Data

US 2015/0145519 A1 May 28, 2015

(51) Int. Cl.
*G01V 3/28* (2006.01)
(52) U.S. Cl.
CPC ...................... *G01V 3/28* (2013.01)
(58) Field of Classification Search
CPC ............ G01V 3/26; G01V 3/10; E21B 47/12
See application file for complete search history.

(56) References Cited

U.S. PATENT DOCUMENTS

| 7,030,617 B2 | 4/2006 | Conti | |
| 2002/0017905 A1* | 2/2002 | Conti | G01V 3/28 324/339 |
| 2005/0156601 A1* | 7/2005 | Dupuis | G01V 3/10 324/330 |
| 2008/0034877 A1* | 2/2008 | Fessele | G01L 19/069 73/700 |
| 2009/0039889 A1* | 2/2009 | Wilt | G01V 3/30 324/338 |
| 2011/0088890 A1* | 4/2011 | Clark | E21B 47/02216 166/66.5 |
| 2011/0308789 A1* | 12/2011 | Zhang | G01V 3/28 166/250.01 |
| 2013/0032404 A1* | 2/2013 | Donderici | E21B 47/024 175/45 |
| 2013/0151158 A1* | 6/2013 | Brooks | E21B 47/022 702/9 |
| 2013/0248247 A1* | 9/2013 | Sugiura | E21B 47/12 175/24 |
| 2015/0115965 A1* | 4/2015 | Reiderman | G01V 3/10 324/339 |

FOREIGN PATENT DOCUMENTS

| KR | 10-0264630 | 6/2000 |
| KR | 10-0563542 | 3/2006 |
| KR | 10-1039834 | 6/2011 |

\* cited by examiner

*Primary Examiner* — Jay Patidar
*Assistant Examiner* — Alvaro Fortich
(74) *Attorney, Agent, or Firm* — Adam Warwick Bell; Matthew Rupert Kaser

(57) ABSTRACT

Borehole electromagnetic exploration or tomography (EM tomography). An induction type broadband 3-component borehole magnetic measuring sensor can accurately and precisely measure a broadband magnetic field about x, y and z axes using a three-dimensional (3D) model within a borehole by monitoring natural variations in the earth's magnetic field or based on EM tomography using the borehole. The measuring sensor is applicable to energy resource fields such as petroleum and coal, mineral resources fields and civil engineering and environmental fields.

19 Claims, 8 Drawing Sheets

INDUCTION TYPE BROADBAND 3-COMPONENT BOREHOLE MAGNETIC MEASURING SENSOR AND BOREHOLE ELECTROMAGNETIC TOMOGRAPHY METHOD USING THE SAME

RELATIONSHIP TO OTHER APPLICATIONS

This application claims priority to and the benefit of Based on KR Patent Application No. 2013-0143412, filed on Nov. 25, 2013, hereby incorporated by reference. All documents and publications referred to herein are also incorporated by reference for all purposes.

BACKGROUND OF THE INVENTION

Field of the Invention

The present invention relates, in general, to borehole electromagnetic exploration or tomography (EM tomography) and more particularly, to an induction type broadband 3-component borehole magnetic measuring sensor able to accurately and precisely measure a broadband magnetic field about x, y and z axes using a three-dimensional (3D) model within a borehole by monitoring natural variations in the earth's magnetic field within the borehole or based on EM tomography using the borehole, such that the measuring sensor is applicable to energy resource fields such as petroleum and coal, mineral resources fields, civil engineering, and environmental fields.

The present invention also relates to a borehole EM tomography method using the induction type broadband 3-component borehole magnetic measuring sensor able to accurately and precisely measure a broadband magnetic field about x, y and z axes using a 3D model within a borehole, such that the borehole EM tomography method is applicable to energy resource fields such as petroleum and coal, mineral resources fields, civil engineering, and environmental fields.

Description of the Related Art

In the related art, proposed are borehole electromagnetic (EM) tomography methods of examining the geological features or environment of the underground by disposing an electromagnetic sensor within a borehole. These EM tomography methods are used to monitor variations in the earth's magnetic field or explore for energy resources such as petroleum or coal or mineral sources such as metals, and are applicable to civil engineering and environmental fields.

Figure 1:
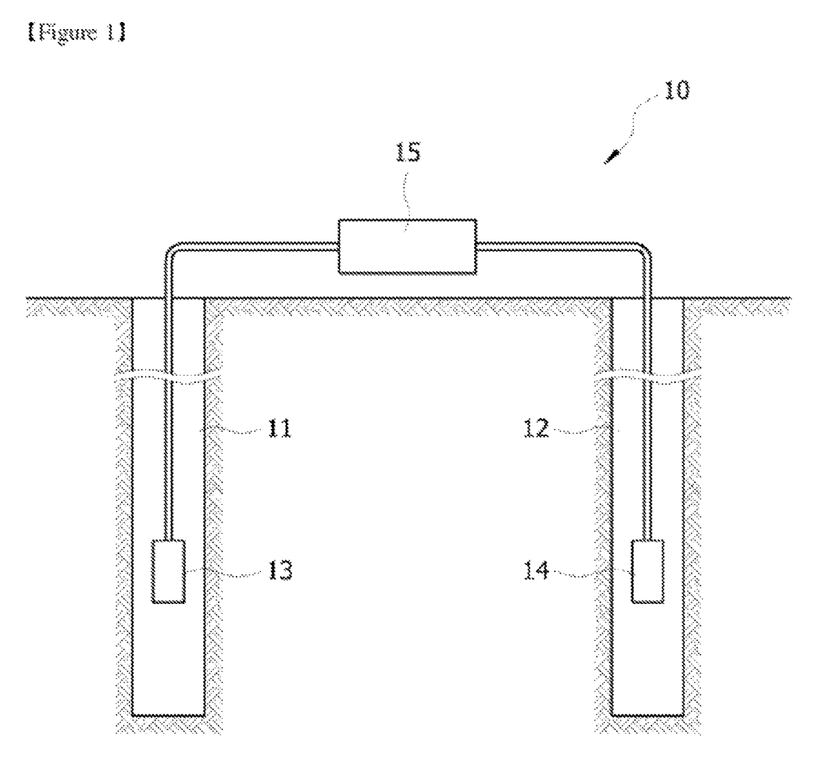
FIG. 1 is a view schematically illustrating the overall configuration of a borehole EM tomography system of the related art.

Reference will be made to FIG. 1 schematically illustrating the overall configuration of a borehole EM tomography system 10 of the related art.

As illustrated in FIG. 1, the borehole EM tomography system 10 includes a transmitter 13 deployed in one borehole 11 and a receiver 14 deployed in the other borehole 12 formed separately from one borehole 11. The receiver 14 receives signals from the transmitter 13. A surface unit 15 deployed on the surface receives and analyzes signals received from the transmitter 13 and the receivers 14, thereby exploring a corresponding area for geological features, main resources buried therein, or the underground environment.

For the exploration, the transmitter 13 can be positioned not only within the borehole but also on the surface, and the receiver 14 can be positioned not only within the borehole 12 but also within the borehole 11 in which the transmitter 13 is deployed.

Specifically, as an example of the related art of the above-mentioned borehole EM tomography system, U.S. Pat. No. 7,030,617 (Apr. 18, 2006) proposed "SYSTEM, APPARATUS, AND METHOD FOR CONDUCTING ELECTROMAGNETIC INDUCTION SURVEYS."

Figure 2:
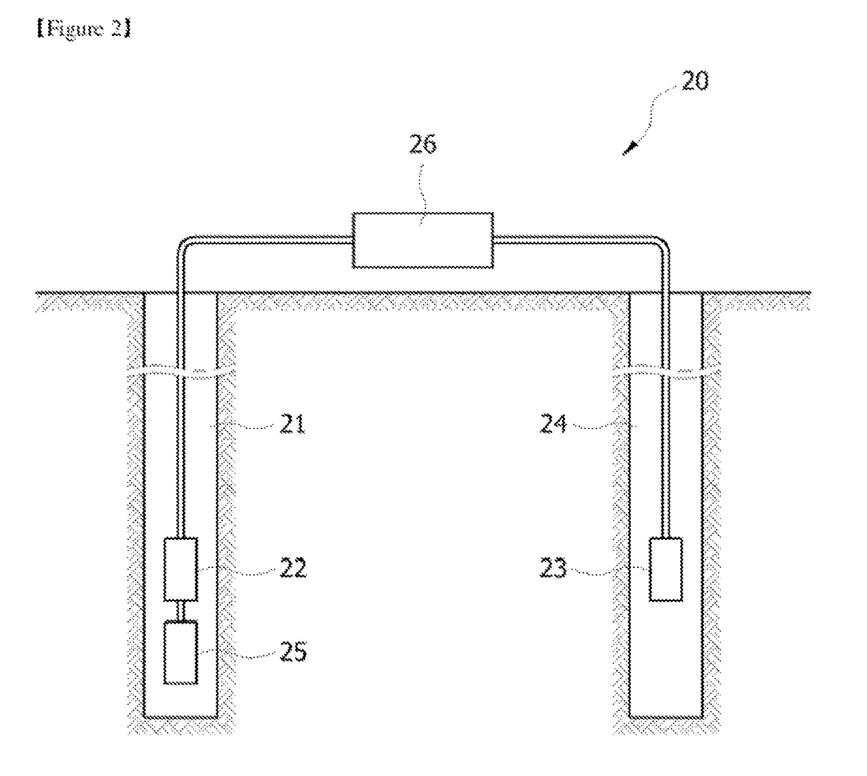
FIG. 2 is a view schematically illustrating the overall configuration of an electromagnetic induction survey system proposed in U.S. Pat. No. 7,030,617 as an example of the related art.

Reference will be made to FIG. 2 schematically illustrating the overall configuration of the electromagnetic induction survey system proposed in U.S. Pat. No. 7,030,617.

More specifically, as illustrated in FIG. 2, in the electromagnetic induction survey system 20 proposed in U.S. Pat. No. 7,030,617, a transmitter 22 for generating magnetic moment is deployed within a borehole 21, a receiver 23 for receiving a magnetic field generated from the transmitter 22 is deployed within another borehole 24 adjacent to the borehole 21. An auxiliary receiver 25 is deployed adjacent to the transmitter 22 to detect the magnetic field generated from the transmitter 22 and attenuation caused by a conductive casing. A surface unit 26 receives and analyzes signals transmitted from the transmitter 22, the receiver 23 and the auxiliary receiver 25, thereby exploring a corresponding area for geological features, main resources buried therein, or underground environment.

Therefore, according to the electromagnetic induction survey system 20 proposed in U.S. Pat. No. 7,030,617, it is possible to determine moment caused by the conductive casing based on the ratio between the magnetic field measured by the auxiliary receiver 25 and the magnetic moment generated by the transmitter 22, thereby obtaining a more accurate measurement.

In general, the geological features have a very sophisticated 3-dimensional (3D) structure. It is required to measure and analyze the direction of a magnetic field in three directions, i.e. x, y and z axis directions, using a 3D model in order to accurately examine the environment of an underground space. However, U.S. Pat. No. 7,030,617 as mentioned above merely proposed the configuration of the transmitter that generates magnetic moment and the receiver that receives the magnetic moment, but did not disclose or suggest any of the above-mentioned technologies for measuring and analyzing three components of a magnetic field.

In addition, other examples of the related art about the above-mentioned borehole EM tomography system include "DEPTH ESTIMATION APPARATUS FOR STEEL EMBEDDED DEEP FOUNDATION USING DIGITAL 3-COMPONENT FLUX GATE MAGNETIC MEASURING DEVICE" proposed in Korean Patent No. 10-0563542 (Mar. 16, 2006) and "APPARATUS AND METHOD FOR DETECTING REINFORCING ROD IN CONCRETE FOUNDATION PILE USING 3-axis MAGNETIC FIELD MEASUREMENT WITHIN BOREHOLE" proposed in Korean Patent No. 10-0264630 (Jun. 2, 2000).

More specifically, first, Korean Patent No. 10-0563542 disclosed a depth estimation apparatus for a steel embedded deep foundation using a digital 3-component flux gate magnetic measuring sensor. In this depth estimation apparatus, the flux gate sensor is inserted into a borehole to detect an induced magnetic field generated from an iron rod and subsequently outputs a digital signal. The depth estimation apparatus also includes a means for converting information about the digital signal generated by the flux gate sensor to RS-422, RS-232 and USB communication protocols. The information detected by the flux gate sensor can be thereby stored and output using a portable computer such as a notebook computer. Accordingly, it is possible to detect and transmit a greater amount of data using the digital flux gate sensor.

In addition, Korean Patent No. 10-0264630 disclosed an apparatus and method for detecting a reinforcing rod in a concrete foundation pile using a 3-axis magnetic field measurement within a borehole. According to this document, a 3-axis magnetic sensor is inserted into a borehole and is moved upwards and downwards to measure an induced magnetic field of an iron rod within a foundation pile, and simultaneously, the depth of the 3-axis magnetic sensor is measured. The depth of the bottom of the foundation pile is measured by storing the measured value of the induced magnetic field of the iron rod and the measured depth of the 3-axis magnetic sensor in a computer.

As described above, Korean Patent Nos. 10-0563542 and 10-0264630 disclosed the technologies for performing a 3D measurement by inserting the 3-axis magnetic sensor into the borehole. However, these technologies proposed in Korean Patent Nos. 10-0563542 and 10-0264630 are intended to measure the bottom depth of the iron rod embedded in the concrete foundation pile. Since it is assumed that the borehole is close to the foundation pile, a specific high frequency band may be used and a wide frequency band is not necessarily required. Therefore, it is possible to use a commercially available flux gate type 3-axis magnetic sensor.

When EM tomography is performed using an electromagnetic wave having a specific frequency in a specific ground environment, a penetration or skin depth δ indicating an possible depth of investigation can be expressed by following Equation 1:

$$\delta = 503 \sqrt{\frac{\rho}{f}} \ (m), \qquad \text{Formula 1}$$

where ρ indicates the electric resistivity (ohm-m) of a geological stratum, and f indicates a frequency (Hz).

More specifically, for example, in the case that EM tomography is performed at an area where the electric resistivity of the geological stratum is 100 ohm-m, the skin depth δ is about 500 m when a 100 Hz frequency is used. When a 10,000 Hz frequency is used, the skin depth δ is about 50 m.

In Korean Patent Nos. 10-0563542 and 10-0264630, the borehole is generally positioned as close as possible to the foundation pile such that the distance between the borehole and the foundation pile is several meters. An electromagnetic wave in a high frequency band ranging from tens to hundreds of kilohertz is available. Consequently, in this case, the purpose of the exploration can be realized using a flux gate magnetic sensor.

In contrast, the borehole EM tomography must be carried out in a variety of geological environments, in which a variety of distances ranging from tens to hundreds of meters is applied between the two boreholes, and the electrical resistivity of the geological stratum ranges from hundreds to tens of thousands of ohm-m. Thus, the frequency of an electromagnetic wave used in such environments must be measurable in a broadband ranging from several Hz to several hundreds of kHz with a very high level of sensitivity. In this case, the above-mentioned flux gate type EM tomography receiver can hardly satisfy both broadband and sensitivity requirements.

Furthermore, like U.S. Pat. No. 7,030,617, neither Korean Patent No. 10-0563542 nor Korean Patent No. 10-0264630 disclosed any specific configuration of the magnetic sensor able to obtain a 3D measurement.

In the borehole EM tomography system for exploring an underground environment for geological features or resources buried therein, the magnetic sensor must include several auxiliary devices in addition to the 3-axis magnetic sensor for detecting three components, i.e. x, y and z axis components, of a magnetic field. The auxiliary devices may include a means for controlling the magnetic sensor, a means for locating the magnetic sensor, a communications means for transmitting a signal received from the magnetic sensor, and a means for supplying electric power to the magnetic sensor for its operation. However, the above-mentioned related art proposed no specific configurations for the magnetic sensor.

Therefore, in order to overcome the above-described problem of the related art, it is required to provide a novel borehole magnetic measuring sensor applicable to a borehole EM tomography system for exploring the underground environment for the geological features, main resources buried therein, or the like and a borehole EM tomography method using the same measuring sensor. It is preferable that the measuring sensor is fabricated as an integrated module for the ease of positioning within a borehole, and can accurately and precisely measure a magnetic field having a broadband frequency within the borehole about x, y and z axes using a 3D model. However, neither an apparatus nor a method satisfying all of these requirements has been introduced yet.

The information disclosed in the Background of the Invention section is only for the enhancement of understanding of the background of the invention, and should not be taken as an acknowledgment or as any form of suggestion that this information forms a prior art that would already be known to a person skilled in the art.

RELATED ART DOCUMENT

1. U.S. Pat. No. 7,030,617 (Apr. 18, 2006)
2. Korean Patent No. 10-0563542 (Mar. 16, 2006)
3. Korean Patent No. 10-0264630 (Jun. 2, 2000)
4. Korean Patent No. 10-1039834 (Jun. 1, 2011)

SUMMARY OF THE INVENTION

Accordingly, the present invention has been made keeping in mind the above problems occurring in the related art, and the present invention is intended to propose an induction type broadband 3-component borehole magnetic measuring sensor applicable to a borehole EM tomography system for exploring the underground environment for the geological features, main resources buried therein, or the like, as will be described below. The measuring sensor is fabricated as an integrated module for the ease of positioning within a borehole, and can accurately and precisely measure a magnetic field within the borehole about x, y and z axes using a 3-dimensional (3D) model.

Also proposed is a borehole EM tomography method able to more accurately and precisely explore the underground environment for the geological features or resources buried therein using the induction type broadband 3-component borehole magnetic measuring sensor that is fabricated as an integrated module for the ease of positioning within a borehole and can accurately and precisely measure a magnetic field within the borehole about x, y and z axes using a 3D model.

In order to achieve the above object, according to one aspect of the present invention, there is provided an induction type broadband 3-component borehole magnetic measuring sensor able to accurately and precisely measure a broadband magnetic field about a broadband frequency and x, y and z axes within a borehole in a borehole electromagnetic tomography system, wherein the borehole electromagnetic tomography system exploring includes a transmitter deployed in one borehole of a pair of parallel boreholes, a receiver deployed in the other borehole of the pair of parallel boreholes to receive a signal from the transmitter, and a surface unit deployed on the surface to receive and analyze signals received from the transmitter and the receiver, and explores an underground environment for geological features or resources buried therein. The measuring sensor includes: a communications unit performing communications with the surface unit; a power unit supplying power; a control unit controlling overall operations of the measuring sensor; a 3-component fluxgate magnetometer measuring an angle of the measuring sensor to with respect to the north within the borehole, as well as the degree of inclination of the measuring sensor within the borehole; a 3-component accelerometer detecting state information about the measuring sensor including a current position, a direction and an incline; and a 3-component magnetic sensor including an analog/digital converter unit converting an analog sensor signal to a digital signal. The 3-component magnetic sensor detects a 3-component broadband magnetic field about x, y and z axis directions. The measuring sensor also includes: a casing housing the communications unit, the power unit, the control unit, the 3-component fluxgate magnetometer, the 3-component accelerometer and the 3-component magnetic sensor; and pressure connectors deployed on both ends of the casing.

According to an embodiment of the present invention, a part of the casing in which the communications unit, the power supply, the control unit and the analog/digital converter unit are deployed may be formed of a conductive material including stainless steel. A part of the casing in which the 3-component fluxgate magnetometer, the 3-component accelerometer and the 3-component magnetic sensor are deployed may be formed of an insulating material including fiber glass in order to prevent signals from being disrupted.

Assuming that the z axis direction is parallel to the lengthwise direction of the casing, the x axis direction is perpendicular to the z axis direction, and the y axis direction is perpendicular to both the x axis direction and the z axis direction, the 3-component magnetic sensor may include: a z-component sensor detecting a magnetic field in the z axis direction, the z-component sensor including a vertical coil module including a rod-shaped or cylindrical core and a plurality of coils wound on the core; an x-component sensor detecting a magnetic field in the x axis direction, the x-component sensor including a plurality of rod-shaped or cylindrical horizontal coil modules that are arranged facing in a diametrical direction of the casing such that the plurality of horizontal coil modules is directed perpendicular to the vertical coil module, the diameter of each of the plurality of horizontal coil modules being smaller than the diameter of the casing; and a y-component sensor detecting a magnetic field in the y axis direction, the y-component sensor including a plurality of the rod-shaped or cylindrical horizontal coil modules that are arranged in a direction perpendicular to directions of the coil modules of the x-component sensor and the z-component sensor.

Each of the horizontal coil modules may include: a core, with the diameter thereof being smaller than the diameter of the casing; a signal coil wound on the core in a plurality of turns; an insulating material deployed around the coil; and a calibration coil wound on the insulating material. The calibration coil allows a current to flow in the opposite direction to a current from the signal coil, whereby each of the horizontal coil modules functions as a bucking coil controlling a current to cancel external noise or system noise by allowing the current to flow in the opposite direction to a current on the signal coil, and has a calibration function to be used as a transmission source to examine frequency-specific response characteristics of the signal coil.

The core may be formed of a μ-metal including ferrite

The vertical coil module may include: a core, with the size thereof corresponding to the entire length of the z-component sensor and the diameter of the casing; a signal coil wound on the core in a plurality of turns; an insulating material deployed around the coil; and a calibration coil wound on the insulating material. The calibration coil allows a current to flow in the opposite direction to a current from the signal coil, whereby the vertical coil module functions as a bucking coil controlling a current to cancel external noise or system noise by allowing the current to flow in the opposite direction to a current on the signal coil, and has a calibration function to be used as a transmission source to examine frequency-specific response characteristics of the signal coil.

The core may be formed of a μ-metal including ferrite

The plurality of horizontal coil modules of the x-component sensor may be connected in parallel to the x-component sensor. The plurality of horizontal coil modules of the y-component sensor may be connected in parallel to the y-component sensor. The single vertical coil module may be connected in series to the z-component sensor. In the sensors for measuring x and y-components of a magnetic field, the horizontal coil modules connected in parallel may increase the cross-sectional area and the number of turns of induction coils in proportion to the number of the horizontal coil modules, thereby increasing the sensitivity of the sensors including the induction coils capable of detecting a minute electromagnetic signal in the environment of the borehole in which the diameter of the borehole is limited.

According to another aspect of the present invention, there is provided a borehole electromagnetic tomography system for exploring an underground environment for geological features or resources buried therein. The system includes: a transmitter deployed within one borehole of a pair of parallel boreholes or on the surface; a receiver deployed within the one borehole of the pair of boreholes, on the surface, or the other borehole of the pair of boreholes to receive a signal from the transmitter; and a surface unit deployed on the surface to receive and analyze signals received from the transmitter and the receiver. The receiver includes the above-described induction type broadband 3-component borehole magnetic measuring sensor.

According to a further aspect of the present invention, there is provided a borehole electromagnetic tomography method for exploring an underground environment for geological features or resources buried therein. The method includes the following steps of: excavating a pair of parallel boreholes; disposing a magnetic sensor and a receiver receiving a signal from the magnetic sensor within the boreholes, respectively; and receiving signals from the magnetic sensor and the receiver and analyzing an underground environment based on the received signals. The magnetic sensor includes the above-described induction type broadband 3-component borehole magnetic measuring sensor.

According to the present invention as set forth above, the induction type broadband 3-component borehole magnetic measuring sensor is applicable to a borehole EM tomography system for exploring the underground environment for the geological features, main resources buried therein, or the like, as will be described below. The measuring sensor is fabricated as an integrated module for the ease of positioning within a borehole, and can accurately and precisely measure a magnetic field within the borehole about x, y and z axes using a 3-dimensional (3D) model.

In addition, according to the present invention, the borehole EM tomography method can more accurately and precisely explore the underground environment for the geological features or resources buried therein using the induction type broadband 3-component borehole magnetic measuring sensor that is fabricated as an integrated module for the ease of positioning within a borehole and can accurately and precisely measure a magnetic field within the borehole about x, y and z axes using a 3D model.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to an induction type broadband 3-component borehole magnetic measuring sensor and a borehole EM tomography method using the same according to the present invention, embodiments of which are illustrated in the accompanying drawings. Wherever possible, the same reference numerals will be used throughout the drawings and the description to refer to the same or like parts.

It is to be understood, however, that specific features described hereinafter are intended to be explanatory only but the present invention is not limited to the following embodiments.

In addition, it is to be understood that, in the following description of the present invention, detailed descriptions of some features may be omitted for the sake of clarity in the case that these features are identical or similar to those of the related art or can be easily understood and performed by a person skilled in the art.

The present invention relates to an induction type broadband 3-component borehole magnetic measuring sensor applicable to a borehole EM tomography system for exploring the underground environment for the geological features, main resources buried therein, or the like, as will be described below. The measuring sensor is fabricated as an integrated module for the ease of positioning within a borehole, and can accurately and precisely measure a magnetic field within the borehole about x, y and z axes using a 3-dimensional (3D) model.

In addition, as will be described later, the present invention relates to a borehole EM tomography method able to more accurately and precisely explore the underground environment for the geological features or main resources buried therein using the induction type broadband 3-component borehole magnetic measuring sensor that is fabricated as an integrated module for the ease of positioning within a borehole and can accurately and precisely measure a magnetic field within the borehole about x, y and z axes using a 3D model.

In addition, in conjunction with the accompanying drawings, reference will now be made to the specific configurations of the induction type broadband 3-component borehole magnetic measuring sensor and the borehole EM tomography method using the same according to exemplary embodiments of the present invention.

Figure 3:
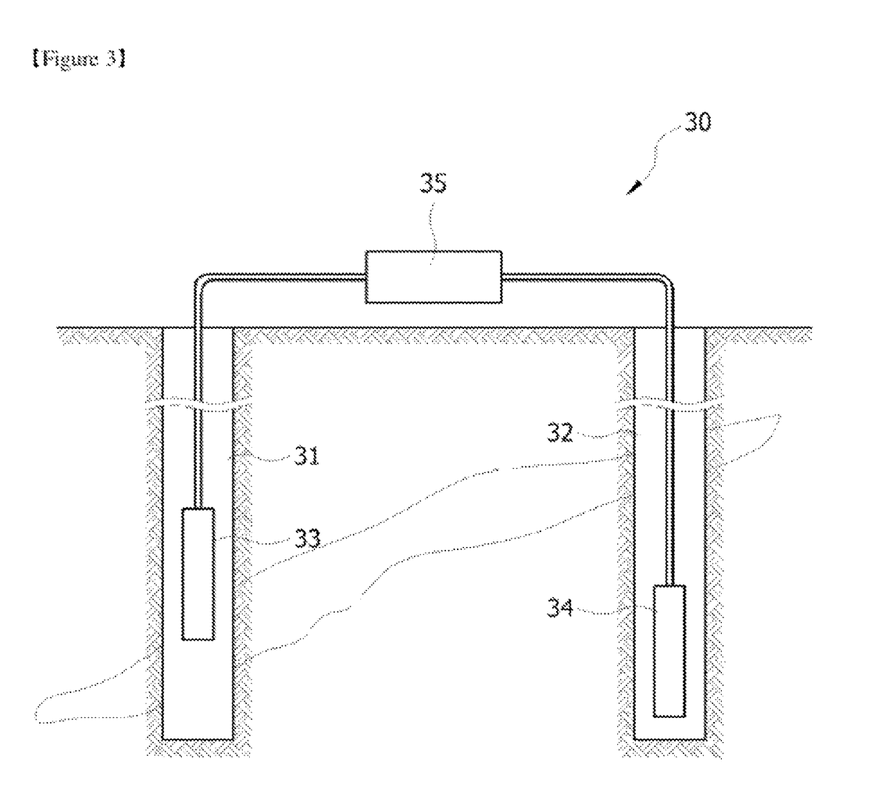
FIG. 3 is a view schematically illustrating the overall configuration of a borehole EM tomography system including a broadband 3-component borehole magnetic measuring sensor according to an exemplary embodiment of the present invention.

First, reference will be made to FIG. 3 schematically illustrating the overall configuration of a borehole EM tomography system including a broadband 3-component borehole magnetic measuring sensor according to an exemplary embodiment of the present invention.

More specifically, as illustrated in FIG. 3, the borehole EM tomography system 30 according to an embodiment of the present invention is similar to the borehole EM tomography systems of the related art in that it includes a pair of boreholes 31 and 32 deployed parallel to each other, a transmitter 33 deployed within the borehole 31, and a surface unit 35 deployed on the surface, but differs from the borehole EM tomography systems of the related art in that it includes the induction type broadband 3-component borehole magnetic measuring sensor according to the present invention, as will be described later.

The transmitter 33 and the surface unit 35 may be configured similar to those of the above-described borehole EM tomography systems of the related art.

Figure 4:
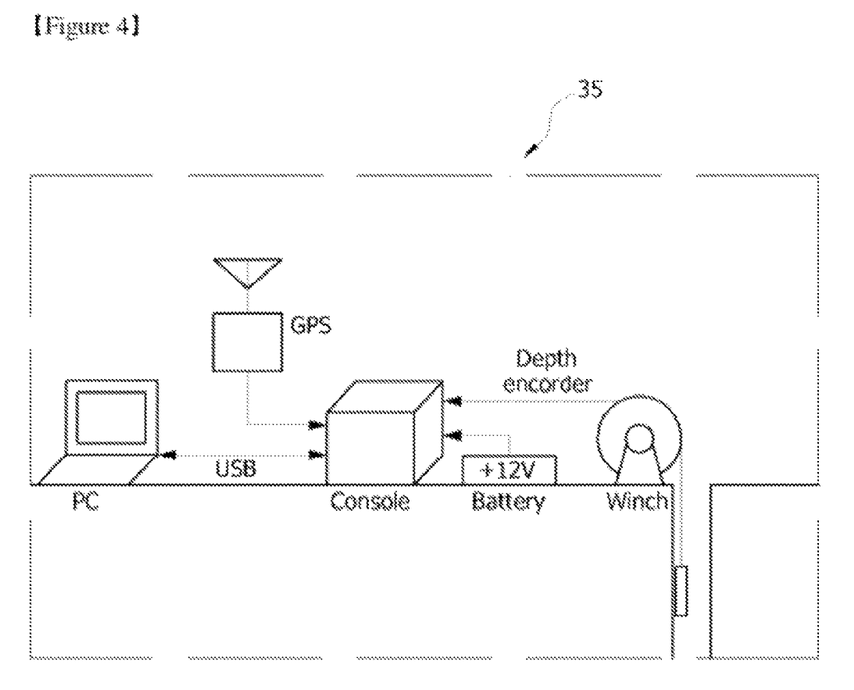
FIG. 4 is a view schematically illustrating the specific configuration of a surface unit of the borehole EM tomography system according to an exemplary embodiment of the present invention.

Reference will be made to FIG. 4 schematically illustrating the specific configuration of the surface unit 35 of the borehole EM tomography system according to an embodiment of the present invention shown in FIG. 3.

As illustrated in FIG. 4, the surface unit 35 includes a transporting means such as a winch, a depth measuring means such as a depth encoder, a locating means such as a global positioning system (GPS), an information processing means such as a console and an input/output means such as a personal computer (PC). The winch transports the receiver 34 that is to be deployed within the borehole 31. The depth encoder detects the position (i.e. depth) of the receiver 34. The GPS detects a current geological position. The console synthesizes and processes signals received from the transmitter 33 and the receiver 34 and information from the depth encoder and the GPS. The PC transmits and receives information to and from the console, and stores and outputs the results processed by the console.

The above-described configuration illustrated in FIG. 4 is merely provided as an example of the surface unit 35 in order to describe the present invention. It is to be understood that the present invention may have a variety of other configurations than the configuration illustrated in FIG. 4.

As described above, for application to exploration for energy or mineral sources, such as petroleum, coal and metal mines, as well as to civil engineering and environmental fields, it is important to precisely measure a magnetic field within a borehole by monitoring variations in the earth's magnetic field and, in particular, based on borehole EM tomography. For this purpose, the inventors proposed an induction type broadband 3-component borehole magnetic measuring sensor having the following configuration.

Herein, the induction type is selected since broadband is used and due to its advantage of superior sensitivity. In general, in a restricted environment in which the diameter of the bores is, for example, 3 inches, the number of turns is required to be as great as possible for precise measurement. Accordingly, the inventors have overcome the above-mentioned problem by connecting a plurality of horizontal coils in parallel.

In addition, the induction type broadband 3-component borehole magnetic measuring sensor is configured to function as a bucking coil that controls a current to cancel either external noise or background noise of a system by allowing the current to flow in the opposite direction to a current on a signal coil, and also has a calibration function such that the measuring sensor can be used as a transmission source to examine the frequency-specific response characteristics of a corresponding coil.

Subsequently, a description will be given of a specific configuration of an induction type broadband 3-component borehole magnetic measuring sensor according to an embodiment of the present invention with reference to FIG. 5.

Figure 5:
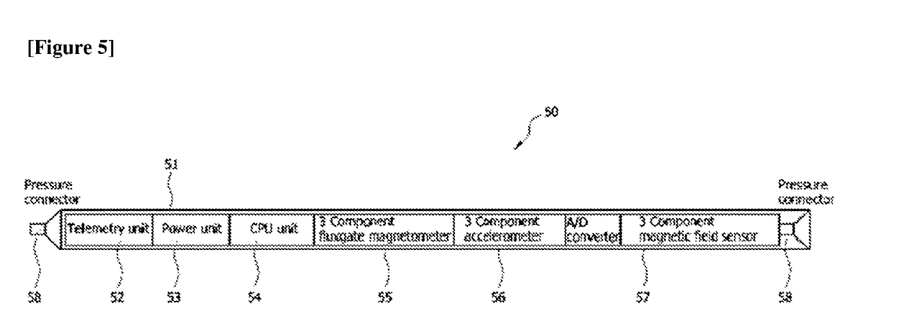
FIG. 5 is a view schematically illustrating the specific configuration of an induction type broadband 3-component borehole magnetic measuring sensor according to an exemplary embodiment of the present invention.

FIG. 5 is a view schematically illustrating the specific configuration of the induction type broadband 3-component borehole magnetic measuring sensor 50 according to an exemplary embodiment of the present invention.

As illustrated in FIG. 5, the induction type broadband 3-component borehole magnetic measuring sensor 50 according to an embodiment of the present invention generally includes a casing 51 and pressure connectors 58 deployed on both ends of the casing 51. In addition, a communications unit such as a telemetry unit 52, a power unit 53, a control unit such as a central processing unit (CPU) 54, a 3-component fluxgate magnetometer 55, a 3-component accelerometer 56 and a 3-component magnetic sensor 57 are deployed inside of the casing 51. The communications unit 52 performs communications with the surface unit 35. The power unit 53 supplies electric power. The control unit 54 controls the overall operations of the measuring sensor 50. The 3-component fluxgate magnetometer 55 measures the angle of the measuring sensor 50 with respect to the north within the borehole, as well as the degree of inclination of the measuring sensor 50 within the borehole. The 3-component accelerometer 56 detects the current position, direction and incline of the measuring sensor 50. The 3-component magnetic sensor 57 includes an analog/digital (A/D) converter unit for converting an analog sensor signal to a digital signal, and detects a magnetic field in x, y and z axis directions.

The part of the above-mentioned casing 51 in which the communications unit 52, the power supply 53 and the control unit 54 are deployed is formed of a conductive material, for example, stainless steel. The part of the above-mentioned casing 51 in which the 3-component fluxgate magnetometer 55, the 3-component accelerometer 56 and the 3-component magnetic sensor 57 are deployed is formed of an insulating material, for example, fiber glass in order to prevent signals from being disrupted.

Figure 6:
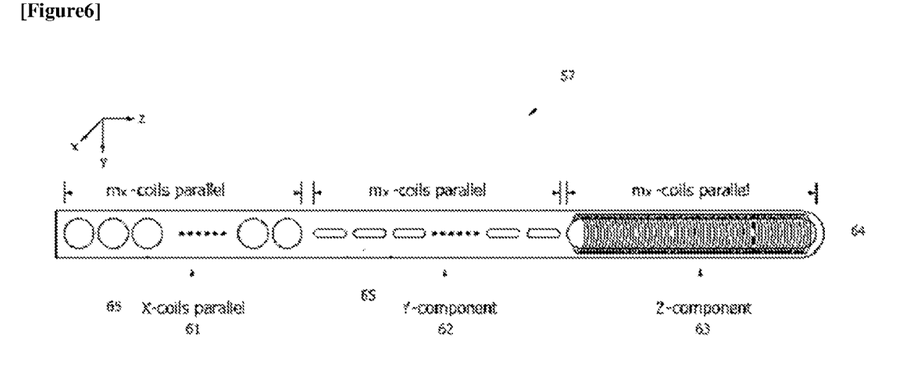
FIG. 6 is a view schematically illustrating the specific configuration of the 3-component magnetic sensor deployed in the induction type broadband 3-component borehole magnetic measuring sensor illustrated in FIG. 5.

In addition, reference will be made to FIG. 6 schematically illustrating the specific configuration of the 3-component magnetic sensor deployed in the induction type broadband 3-component borehole magnetic measuring sensor illustrated in FIG. 5.

As illustrated in FIG. 6, the 3-component magnetic sensor 57 includes an x-component sensor 61 for detecting an x axis magnetic field, a y-component sensor 62 for detecting a y axis magnetic field and a z-component sensor 63 for detecting a z axis magnetic field.

More specifically, assuming that the z axis is directed parallel to the lengthwise direction of the casing 51, i.e. the direction of the borehole in which the induction type 3-component borehole magnetic measuring sensor 50 shown in FIG. 5 is deployed, the x axis is directed perpendicular to the z axis, and the y axis is perpendicular to both the x axis and the z axis, the x-component sensor 61, the y-component sensor 62 and the z-component sensor 63 are arranged with respect to the x, y and z axes, respectively, as illustrated in FIG. 6.

As illustrated in FIG. 6, in the z-component sensor 63, a vertical coil module 64 including a rod-shaped or cylindrical core and a plurality of coils wound on the core is integrally deployed. In the x-component sensor 61, a plurality of rod-shaped or cylindrical horizontal coil modules 65 are arranged facing in a diametrical direction (or radial direction) of the casing 51, such that the horizontal coil modules 65 are directed perpendicular to the vertical coil module 64. The diameter of each of the horizontal coil modules 65 is smaller than the diameter of the casing 51. In addition, in the y-component sensor 62, a plurality of horizontal coil modules 65 are arranged in a direction perpendicular to the coil modules of the x-component sensor 61 and the z-component sensor 63.

In addition, reference will be made to FIG. 7A, FIG. 7B, FIG. 8A and FIG. 8B schematically illustrating the specific configurations of the horizontal coil module 65 and the vertical coil module 64 deployed in the 3-component magnetic sensor 57 illustrated in FIG. 6.

Figure 7A:
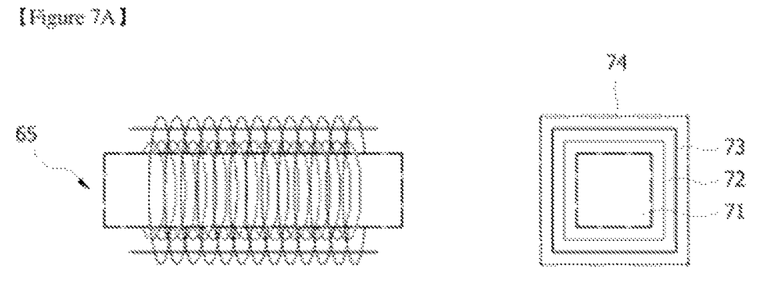
FIG. 7A and FIG. 7B are views schematically illustrating the specific configuration of a horizontal coil module deployed in the 3-component magnetic sensor illustrated in FIG. 6.

More specifically, as illustrated in FIG. 7A, each of the horizontal coil modules 65 deployed in the x-component sensor 61 and the y-component sensor 62 is formed, for example, by winding a plurality of signal coils 72 on a ferrite core 71, the diameter of which is smaller than that of the casing 51. In addition, an insulating material 73 is deployed around the signal coil 72 and a calibration coil 74 is wound on the insulating material 73 in order to improve the frequency characteristic of the horizontal coil module 65.

That is, the horizontal coil module 65 according to an embodiment of the present invention has the calibration coil 74 wound on the outermost portion, in which the calibration coil 74 allows a current to flow in the opposite direction to a current from the signal coil 72. With this configuration, the horizontal coil module 65 functions as a bucking coil that controls a current to cancel external noise or system noise by allowing the current to flow in the opposite direction to the signal coil, and also has a calibration function such that the horizontal coil module 65 can be used as a transmission source to examine the frequency-specific response characteristics of the coil.

Figure 7B:
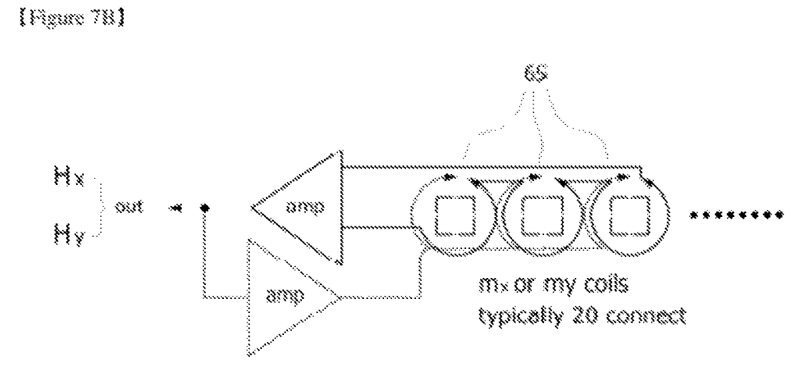

In addition, as illustrated in FIG. 7B, a suitable number of horizontal coil modules 71, for example, 20 horizontal coil modules 71 are connected in parallel. This configuration can lead to a sort of amplification effect, thereby producing a sufficient level of signal intensity detectable within a restricted space such as the inside of the borehole.

Figure 8A:
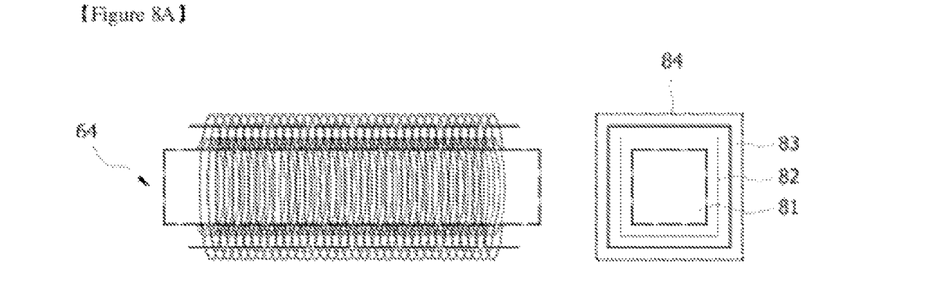
FIG. 8A and FIG. 8B are views schematically showing a specific configuration of a vertical coil module deployed in the 3-component magnetic sensor illustrated in FIG. 6.

Furthermore, as illustrated in FIG. 8A, the vertical coil module 64 deployed in the z-component sensor 63 is formed in the same fashion as the horizontal coil module 65 illustrated in FIG. 7A. Specifically, the vertical coil module 64 includes a ferrite core 81, a plurality of signal coils 82 wound on the core 81, an insulating material 83 deployed around the signal coils 82, and a calibration coil wound on the insulating material 83. As different features, the vertical coil module 64 is configured as an integral part, the length and diameter of which correspond to the entire length of the z-component sensor 63 and the diameter of the casing 51.

Figure 8B:
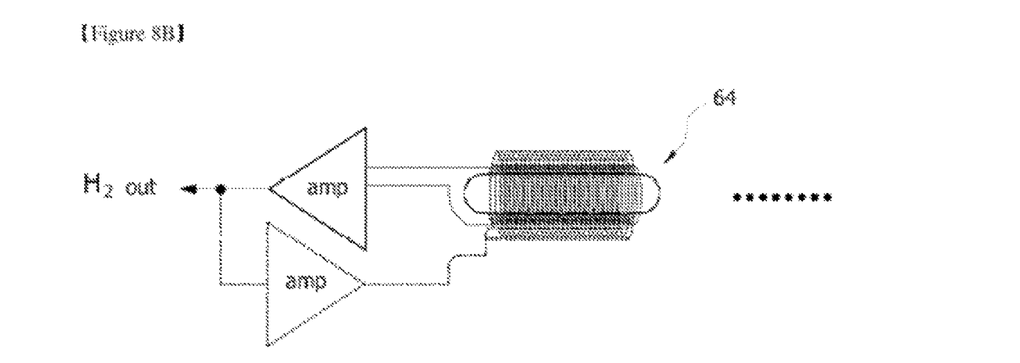

That is, as shown in FIG. 8B, the vertical coil module 64 is configured as a single coil module that is directly connected to the z-component sensor 63.

As described above, the induction type broadband 3-component borehole magnetic measuring sensor is provided according to an embodiment of the present invention. It is also possible to more accurately and easily carry out exploration by performing the borehole EM tomography using this induction type broadband 3-component borehole magnetic measuring sensor.

The configurations according to the certain embodiment of the present invention disclosed with reference to FIG. 5 to FIG. 8B are merely examples intended to illustrate the present invention. It is to be understood that the present invention may have configurations different from those illustrated with reference to FIG. 5 to FIG. 8B. A person having ordinary skill in the art will make a variety of changes or modifications to the above-described shape, material or structure as required.

As described above, according to the present invention, it is possible to realize the induction type broadband 3-component borehole magnetic measuring sensor and the borehole EM tomography method using the same.

In the induction type broadband 3-component borehole magnetic measuring sensor and the borehole EM tomography method using the same according to the present invention realized as described above, the induction type broadband 3-component borehole magnetic measuring sensor is fabricated as an integrated module for the ease of positioning within a borehole, and can accurately and precisely measure a magnetic field within the borehole about x, y and z axes using a 3D model. Accordingly, the induction type broadband 3-component borehole magnetic measuring sensor is applicable to a borehole EM tomography system for exploring the underground environment for the geological features, main resources buried therein, or the like.

In addition, according to the present invention, it is possible to provide the borehole EM tomography method able to more accurately and precisely explore the underground environment for the geological features or main resources buried therein using the induction type broadband 3-component borehole magnetic measuring sensor that is fabricated as an integrated module for the ease of positioning within a borehole and can accurately and precisely measure a magnetic field within the borehole about x, y and z axes using a 3D model.

As set forth above, the induction type broadband 3-component borehole magnetic measuring sensor and the borehole EM tomography method using the same according the certain embodiments of to the present invention have been described in detail. However, the present invention is not limited to those certain embodiments. It is therefore to be understood that a person skilled in the art will appreciate that various modifications, changes, combinations and substitutions are possible as required in the design or other various reasons, without departing from the scope and spirit of the present invention as disclosed in the accompanying claims.

What is claimed is:

1. An induction type broadband 3-component borehole magnetic measuring sensor able to accurately and precisely measure a broadband magnetic field about a broadband frequency and x, y and z axes within a borehole in a borehole electromagnetic tomography system, wherein the borehole electromagnetic tomography system exploring includes a transmitter deployed in one borehole of a pair of parallel boreholes, a receiver deployed in the other borehole of the pair of parallel boreholes to receive a signal from the transmitter, and a surface unit deployed on a surface to receive and analyze signals received from the transmitter and the receiver, and explores an underground environment for geological features or resources buried therein, the measuring sensor comprising:

a communications unit performing communications with the surface unit;

a power unit supplying power;

a control unit controlling overall operations of the measuring sensor;

a 3-component fluxgate magnetometer measuring an angle of the measuring sensor to with respect to north within the borehole, as well as a degree of inclination of the measuring sensor within the borehole;

a 3-component accelerometer detecting state information about the measuring sensor including a current position, a direction and an incline;

a 3-component magnetic sensor comprising an analog/digital converter unit converting an analog sensor signal to a digital signal, wherein the 3-component magnetic sensor detects a 3-component broadband magnetic field about x, y and z axis directions;

assuming that the z axis direction is parallel to a lengthwise direction of the casing, the x axis direction is perpendicular to the z axis direction, and the y axis direction is perpendicular to both the x axis direction and the z axis direction, the 3-component magnetic sensor comprises:

a z-component sensor detecting a magnetic field in the z axis direction, the z-component sensor comprising a vertical coil module including a rod-shaped or cylindrical core and a plurality of coils wound on the core;

an x-component sensor detecting a magnetic field in the x axis direction, the x-component sensor comprising a plurality of rod-shaped or cylindrical horizontal coil modules that are connected in parallel and arranged facing in a diametrical direction of the casing such that the plurality of horizontal coil modules is directed perpendicular to the vertical coil module, a diameter of each of the plurality of horizontal coil modules being smaller than a diameter of the casing; and a y-component sensor detecting a magnetic field in the y axis direction, the y-component sensor comprising a plurality of the rod-shaped or cylindrical horizontal coil modules that are arranged in a direction perpendicular to directions of the coil modules of the x-component sensor and the z-component sensor;

a casing housing the communications unit, the power unit, the control unit, the 3-component fluxgate magnetometer, the 3-component accelerometer and the 3-component magnetic sensor; and pressure connectors deployed on both ends of the casing.

2. The measuring sensor according to claim 1, wherein a part of the casing in which the communications unit, the power supply, the control unit and the analog/digital converter unit are deployed is formed of a conductive material including stainless steel, and a part of the casing in which the 3-component fluxgate magnetometer, the 3-component accelerometer and the 3-component magnetic sensor are deployed is formed of an insulating material including fiber glass in order to prevent signals from being disrupted.

3. The measuring sensor according to claim 1, wherein each of the horizontal coil modules comprises:

a core, with a diameter thereof being smaller than a diameter of the casing;

a signal coil wound on the core in a plurality of turns;

an insulating material deployed around the coil; and a calibration coil wound on the insulating material, wherein the calibration coil allows a current to flow in an opposite direction to a current from the signal coil, whereby each of the horizontal coil modules functions as a bucking coil controlling a current to cancel external noise or system noise by allowing the current to flow in an opposite direction to a current on the signal coil, and has a calibration function to be used as a transmission source to examine frequency-specific response characteristics of the signal coil.

4. The measuring sensor according to claim 3, wherein the core is formed of a µ-metal including ferrite.

5. The measuring sensor according to claim 1, wherein the vertical coil module comprises:

a core, with a size thereof corresponding to an entire length of the z-component sensor and a diameter of the casing;

a signal coil wound on the core in a plurality of turns;

an insulating material deployed around the coil; and a calibration coil wound on the insulating material, wherein the calibration coil allows a current to flow in an opposite direction to a current from the signal coil, whereby the vertical coil module functions as a bucking coil controlling a current to cancel external noise or system noise by allowing the current to flow in an opposite direction to a current on the signal coil, and has a calibration function to be used as a transmission source to examine frequency-specific response characteristics of the signal coil.

6. The measuring sensor according to claim 5, wherein the core is formed of a µ-metal including ferrite.

7. The measuring sensor according to claim 1, wherein the plurality of horizontal coil modules of the x-component sensor are connected in parallel to the x-component sensor, the plurality of horizontal coil modules of the y-component sensor are connected in parallel to the y-component sensor, and the single vertical coil module is connected in series to the z-component sensor, wherein, in the sensors for measuring x and y-components of a magnetic field, the horizontal coil modules connected in parallel increase a cross-sectional area and a number of turns of induction coils in proportion to a number of the horizontal coil modules, thereby increasing a sensitivity of the sensors including the induction coils capable of detecting a minute electromagnetic signal in an environment of the borehole in which a diameter of the borehole is limited.

8. A borehole electromagnetic tomography system for exploring an underground environment for geological features or resources buried therein, the system comprising:

a transmitter deployed within one borehole of a pair of parallel boreholes or on a surface;

a receiver deployed within the one borehole of the pair of boreholes, on the surface, or the other borehole of the pair of boreholes to receive a signal from the transmitter; and a surface unit deployed on the surface to receive and analyze signals received from the transmitter and the receiver, wherein the receiver comprises the induction type broadband 3-component borehole magnetic measuring sensor able to accurately and precisely measure a broadband magnetic field about a broadband frequency and x, y and z axes within a borehole in a borehole electromagnetic tomography system, wherein the borehole electromagnetic tomography system exploring includes a transmitter deployed in one borehole of a pair of parallel boreholes, a receiver deployed in the other borehole of the pair of parallel boreholes to receive a signal from the transmitter, and a surface unit deployed on a surface to receive and analyze signals received from the transmitter and the receiver, and explores an underground environment for geological features or resources buried therein, the measuring sensor comprising:

a communications unit performing communications with the surface unit;

a power unit supplying power;

a control unit controlling overall operations of the measuring sensor;

a 3-component fluxgate magnetometer measuring an angle of the measuring sensor to with respect to north within the borehole, as well as a degree of inclination of the measuring sensor within the borehole;

a 3-component accelerometer detecting state information about the measuring sensor including a current position, a direction and an incline;

a 3-component magnetic sensor comprising an analog/digital converter unit converting an analog sensor signal to a digital signal, wherein the 3-component magnetic sensor detects a 3-component broadband magnetic field about x, y and z axis directions;

a casing housing the communications unit, the power unit, the control unit, the 3-component fluxgate magnetometer, the 3-component accelerometer and the 3-component magnetic sensor; and pressure connectors deployed on both ends of the casing.

9. A borehole electromagnetic tomography method for exploring an underground environment for geological features or resources buried therein, the method comprising:

excavating a pair of parallel boreholes;

disposing a magnetic sensor and a receiver receiving a signal from the magnetic sensor within the boreholes, respectively; and receiving signals from the magnetic sensor and the receiver and analyzing an underground environment based on the received signals, wherein the magnetic sensor comprises the induction type broadband 3-component borehole magnetic measuring sensor able to accurately and precisely measure a broadband magnetic field about a broadband frequency and x, y and z axes within a borehole in a borehole electromagnetic tomography system, wherein the borehole electromagnetic tomography system exploring includes a transmitter deployed in one borehole of a pair of parallel boreholes, a receiver deployed in the other borehole of the pair of parallel boreholes to receive a signal from the transmitter, and a surface unit deployed on a surface to receive and analyze signals received from the transmitter and the receiver, and explores an underground environment for geological features or resources buried therein, the measuring sensor comprising:
a communications unit performing communications with the surface unit;
a power unit supplying power;
a control unit controlling overall operations of the measuring sensor;
a 3-component fluxgate magnetometer measuring an angle of the measuring sensor to with respect to north within the borehole, as well as a degree of inclination of the measuring sensor within the borehole;
a 3-component accelerometer detecting state information about the measuring sensor including a current position, a direction and an incline;
a 3-component magnetic sensor comprising an analog/digital converter unit converting an analog sensor signal to a digital signal, wherein the 3-component magnetic sensor detects a 3-component broadband magnetic field about x, y and z axis directions;
a casing housing the communications unit, the power unit, the control unit, the 3-component fluxgate magnetometer, the 3-component accelerometer and the 3-component magnetic sensor; and
pressure connectors deployed on both ends of the casing.

10. The borehole electromagnetic tomography system of claim 8, wherein a part of the casing in which the communications unit, the power supply, the control unit and the analog/digital converter unit are deployed is formed of a conductive material including stainless steel, and a part of the casing in which the 3-component fluxgate magnetometer, the 3-component accelerometer and the 3-component magnetic sensor are deployed is formed of an insulating material including fiber glass in order to prevent signals from being disrupted.

11. The borehole electromagnetic tomography method of claim 9, wherein a part of the casing in which the communications unit, the power supply, the control unit and the analog/digital converter unit are deployed is formed of a conductive material including stainless steel, and a part of the casing in which the 3-component fluxgate magnetometer, the 3-component accelerometer and the 3-component magnetic sensor are deployed is formed of an insulating material including fiber glass in order to prevent signals from being disrupted.

12. The borehole electromagnetic tomography system of claim 8, wherein, assuming that the z axis direction is parallel to a lengthwise direction of the casing, the x axis direction is perpendicular to the z axis direction, and the y axis direction is perpendicular to both the x axis direction and the z axis direction, the 3-component magnetic sensor comprises:
a z-component sensor detecting a magnetic field in the z axis direction, the z-component sensor comprising a vertical coil module including a rod-shaped or cylindrical core and a plurality of coils wound on the core;
an x-component sensor detecting a magnetic field in the x axis direction, the x-component sensor comprising a plurality of rod-shaped or cylindrical horizontal coil modules that are arranged facing in a diametrical direction of the casing such that the plurality of horizontal coil modules is directed perpendicular to the vertical coil module, a diameter of each of the plurality of horizontal coil modules being smaller than a diameter of the casing; and
a y-component sensor detecting a magnetic field in the y axis direction, the y-component sensor comprising a plurality of the rod-shaped or cylindrical horizontal coil modules that are arranged in a direction perpendicular to directions of the coil modules of the x-component sensor and the z-component sensor.

13. The borehole electromagnetic tomography method of claim 9, wherein, assuming that the z axis direction is parallel to a lengthwise direction of the casing, the x axis direction is perpendicular to the z axis direction, and the y axis direction is perpendicular to both the x axis direction and the z axis direction, the 3-component magnetic sensor comprises:
a z-component sensor detecting a magnetic field in the z axis direction, the z-component sensor comprising a vertical coil module including a rod-shaped or cylindrical core and a plurality of coils wound on the core;
an x-component sensor detecting a magnetic field in the x axis direction, the x-component sensor comprising a plurality of rod-shaped or cylindrical horizontal coil modules that are arranged facing in a diametrical direction of the casing such that the plurality of horizontal coil modules is directed perpendicular to the vertical coil module, a diameter of each of the plurality of horizontal coil modules being smaller than a diameter of the casing; and
a y-component sensor detecting a magnetic field in the y axis direction, the y-component sensor comprising a plurality of the rod-shaped or cylindrical horizontal coil modules that are arranged in a direction perpendicular to directions of the coil modules of the x-component sensor and the z-component sensor.

14. The borehole electromagnetic tomography system of claim 8 wherein, assuming that the z axis direction is parallel to a lengthwise direction of the casing, the x axis direction is perpendicular to the z axis direction, and the y axis direction is perpendicular to both the x axis direction and the z axis direction, the 3-component magnetic sensor comprises:
a z-component sensor detecting a magnetic field in the z axis direction, the z-component sensor comprising a vertical coil module including a rod-shaped or cylindrical core and a plurality of coils wound on the core;
an x-component sensor detecting a magnetic field in the x axis direction, the x-component sensor comprising a plurality of rod-shaped or cylindrical horizontal coil modules that are arranged facing in a diametrical direction of the casing such that the plurality of horizontal coil modules is directed perpendicular to the vertical coil module, a diameter of each of the plurality of horizontal coil modules being smaller than a diameter of the casing; and
a y-component sensor detecting a magnetic field in the y axis direction, the y-component sensor comprising a plurality of the rod-shaped or cylindrical horizontal coil modules that are arranged in a direction perpendicular to directions of the coil modules of the x-component sensor and the z-component sensor,
the measuring sensor according to claim 1, wherein each of the horizontal coil modules comprises:

a core, with a diameter thereof being smaller than a diameter of the casing;
a signal coil wound on the core in a plurality of turns;
an insulating material deployed around the coil; and
a calibration coil wound on the insulating material,
wherein the calibration coil allows a current to flow in an opposite direction to a current from the signal coil, whereby each of the horizontal coil modules functions as a bucking coil controlling a current to cancel external noise or system noise by allowing the current to flow in an opposite direction to a current on the signal coil, and has a calibration function to be used as a transmission source to examine frequency-specific response characteristics of the signal coil.

15. The borehole electromagnetic tomography method of claim 9, wherein, assuming that the z axis direction is parallel to a lengthwise direction of the casing, the x axis direction is perpendicular to the z axis direction, and the y axis direction is perpendicular to both the x axis direction and the z axis direction, the 3-component magnetic sensor comprises:
    a z-component sensor detecting a magnetic field in the z axis direction, the z-component sensor comprising a vertical coil module including a rod-shaped or cylindrical core and a plurality of coils wound on the core;
    an x-component sensor detecting a magnetic field in the x axis direction, the x-component sensor comprising a plurality of rod-shaped or cylindrical horizontal coil modules that are arranged facing in a diametrical direction of the casing such that the plurality of horizontal coil modules is directed perpendicular to the vertical coil module, a diameter of each of the plurality of horizontal coil modules being smaller than a diameter of the casing; and
    a y-component sensor detecting a magnetic field in the y axis direction, the y-component sensor comprising a plurality of the rod-shaped or cylindrical horizontal coil modules that are arranged in a direction perpendicular to directions of the coil modules of the x-component sensor and the z-component sensor,
    the measuring sensor according to claim 1, wherein each of the horizontal coil modules comprises:
    a core, with a diameter thereof being smaller than a diameter of the casing;
    a signal coil wound on the core in a plurality of turns;
    an insulating material deployed around the coil; and
    a calibration coil wound on the insulating material,
    wherein the calibration coil allows a current to flow in an opposite direction to a current from the signal coil, whereby each of the horizontal coil modules functions as a bucking coil controlling a current to cancel external noise or system noise by allowing the current to flow in an opposite direction to a current on the signal coil, and has a calibration function to be used as a transmission source to examine frequency-specific response characteristics of the signal coil.

16. The borehole electromagnetic tomography system of claim 14 wherein the core of the measuring sensor is formed of a μ-metal including ferrite.

17. The borehole electromagnetic tomography method of claim 15 wherein the core of the measuring sensor is formed of a μ-metal including ferrite.

18. The borehole electromagnetic tomography system of claim 12 wherein the vertical coil module of the measuring sensor comprises:
    a core, with a size thereof corresponding to an entire length of the z-component sensor and a diameter of the casing;
    a signal coil wound on the core in a plurality of turns;
    an insulating material deployed around the coil; and
    a calibration coil wound on the insulating material,
    wherein the calibration coil allows a current to flow in an opposite direction to a current from the signal coil, whereby the vertical coil module functions as a bucking coil controlling a current to cancel external noise or system noise by allowing the current to flow in an opposite direction to a current on the signal coil, and has a calibration function to be used as a transmission source to examine frequency-specific response characteristics of the signal coil.

19. The borehole electromagnetic tomography method of claim 13 wherein the vertical coil module of the measuring sensor comprises:
    a core, with a size thereof corresponding to an entire length of the z-component sensor and a diameter of the casing;
    a signal coil wound on the core in a plurality of turns;
    an insulating material deployed around the coil; and
    a calibration coil wound on the insulating material,
    wherein the calibration coil allows a current to flow in an opposite direction to a current from the signal coil, whereby the vertical coil module functions as a bucking coil controlling a current to cancel external noise or system noise by allowing the current to flow in an opposite direction to a current on the signal coil, and has a calibration function to be used as a transmission source to examine frequency-specific response characteristics of the signal coil.

* * * * *